United States Patent [19]

Preller et al.

[11] Patent Number: 5,213,458
[45] Date of Patent: May 25, 1993

[54] METHOD AND APPARATUS FOR CONTAINERIZED SHIPMENT OF AUTOMOBILES

[75] Inventors: Robert E. Preller, Mount Holly; James T. Wilson, Willingboro, both of N.J.; Donald Miedama, Morrisville, Pa.

[73] Assignee: Sea-Land Corporation, Inc., Elizabeth, N.J.

[21] Appl. No.: 824,720

[22] Filed: Jan. 17, 1992

Related U.S. Application Data

[63] Continuation of Ser. No. 559,294, Jul. 27, 1990, abandoned.

[51] Int. Cl.[5] .................................................. E04H 6/06
[52] U.S. Cl. ........................................ 410/26; 414/608; 414/498; 414/229
[58] Field of Search .................... 410/2, 3, 4, 5, 6, 24, 410/24.1, 25, 26, 27, 28, 28.1, 29, 29.1; 414/229, 230, 347, 462, 400, 498, 537, 608

[56] References Cited

U.S. PATENT DOCUMENTS

| | | | |
|---|---|---|---|
| 2,906,405 | 9/1959 | Erickson | 414/608 X |
| 3,178,216 | 4/1965 | Huber . | |
| 3,378,157 | 4/1968 | James | 414/607 |
| 3,650,416 | 3/1972 | Bodenheimer . | |
| 3,675,795 | 7/1972 | Dluhy | 414/238 |
| 3,685,856 | 8/1972 | Blunden | 410/26 X |
| 3,709,155 | 1/1973 | Pringle | 410/26 X |
| 4,090,621 | 5/1978 | Parent | 414/230 |
| 4,239,275 | 12/1980 | Morneys et al. | 410/26 X |
| 4,273,484 | 6/1981 | Blanar | 410/12 |
| 4,343,401 | 8/1982 | Paulyson . | |
| 4,369,009 | 1/1983 | Fulford | 410/12 X |
| 4,371,298 | 2/1983 | Van Iperen . | |
| 4,611,961 | 9/1986 | Van Iperen et al. . | |
| 4,637,763 | 4/1987 | Van Iperen . | |
| 4,759,668 | 7/1988 | Larsen et al. . | |
| 4,911,590 | 3/1990 | Green | 410/26 |
| 4,917,557 | 4/1990 | Kato et al. | 410/26 X |
| 4,919,582 | 4/1990 | Bates et al. . | |

FOREIGN PATENT DOCUMENTS 1529431 10/1978 United Kingdom ............ 410/24

OTHER PUBLICATIONS

Borzo, "Autos in containers could fill empty backhaul on stack trains," *Traffic World*, p. 12, (Jul. 6, 1987).
Yeaple, "A Field Day for Hydraulics," 43: 51–55, *Design News*, (Jul. 20, 1987).
Brochure distributed to those in attendance at the Ghent Shipping Symposium in Oct. of 1988.

*Primary Examiner*—Michael S. Huppert
*Assistant Examiner*—James Eller
*Attorney, Agent, or Firm*—Scully, Scott, Murphy & Presser

[57] ABSTRACT

A collapsible car rack system for use in intermodal containers wherein each car rack is capable of carrying two automobiles. Each rack is configured so that two racks completely fill a standard 40 ft. intermodal container and each rack is also fitted with a dunnage device in order to extend the size of the rack to fill a standard 45 ft. intermodal container. Each rack is equipped with push plates and pulling eyes so that the loaded racks may be inserted into, and withdrawn from a standard intermodal container with a forklift. In use, each rack will accommodate two automobiles the first of which is driven onto the rack in a collapsed condition and after erecting a top portion of the rack with a forklift and securing by vertical support members, a second automobile is driven onto the lower portion of each rack. The erect rack, loaded with two automobiles is of a suitable size to be loaded into a standard intermodal container with a forklift.

13 Claims, 7 Drawing Sheets

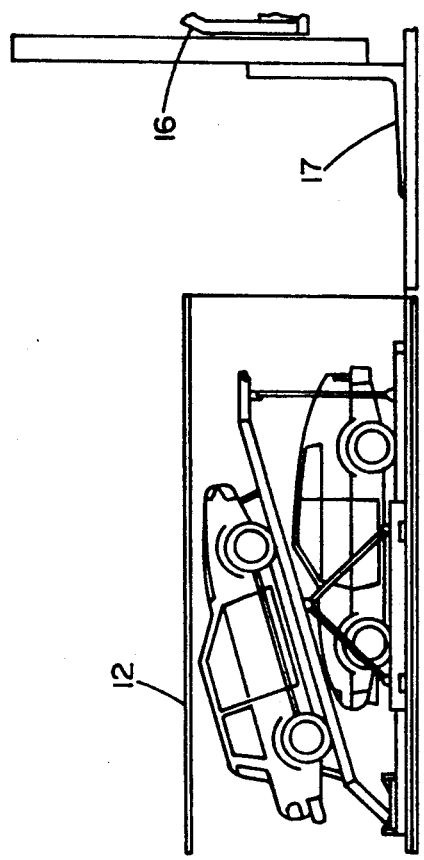
FIG.1f
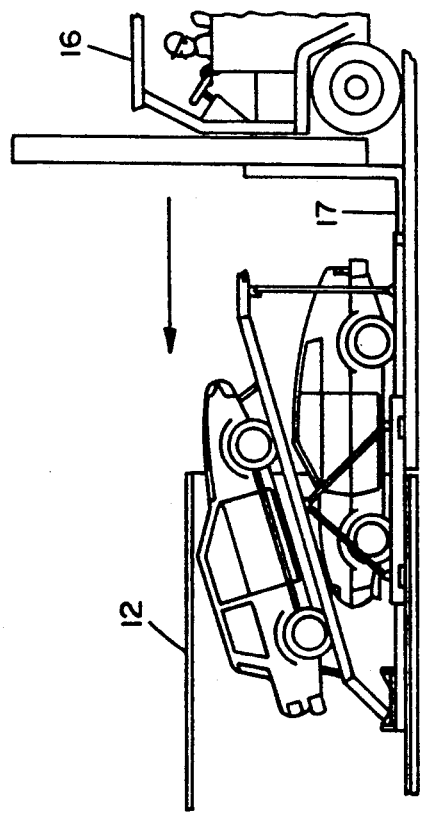
FIG.1e
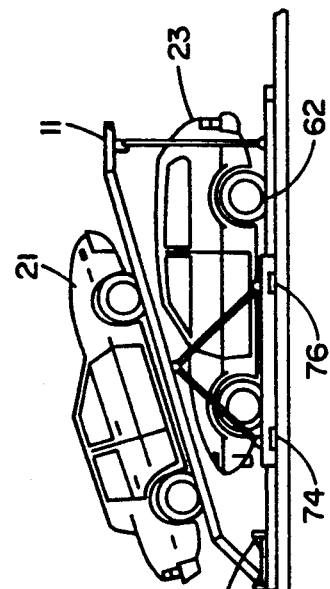
FIG.1g
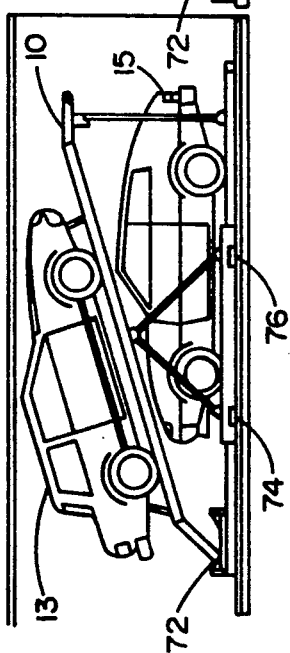

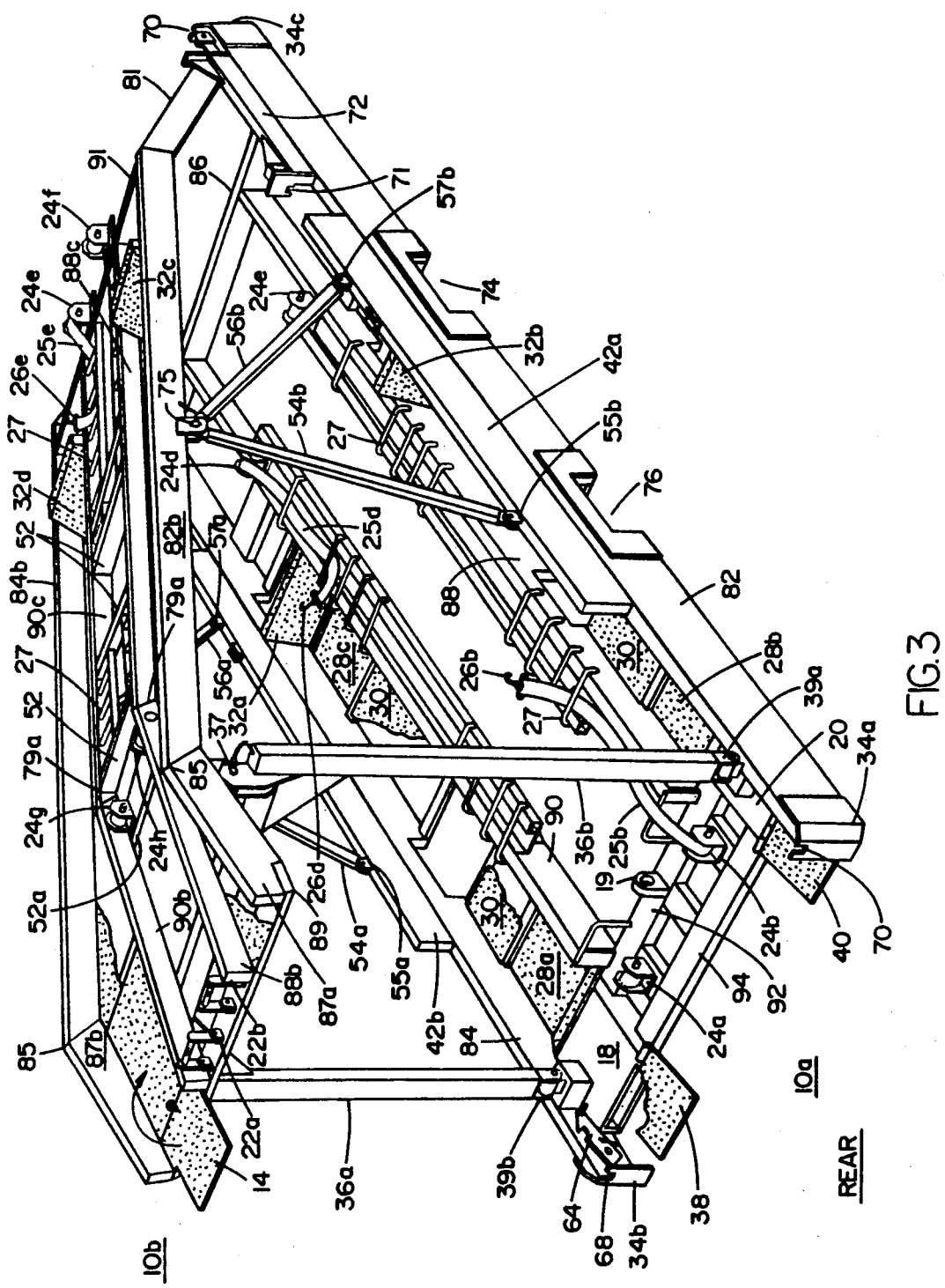

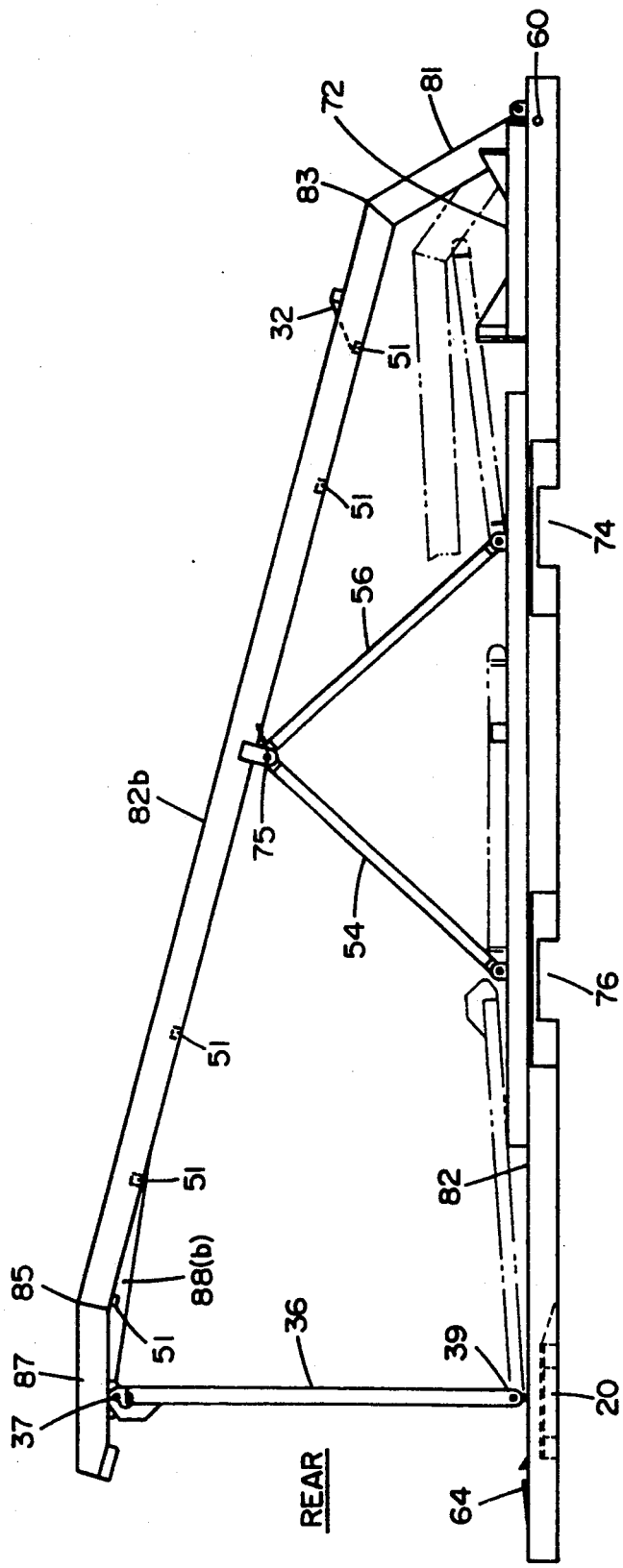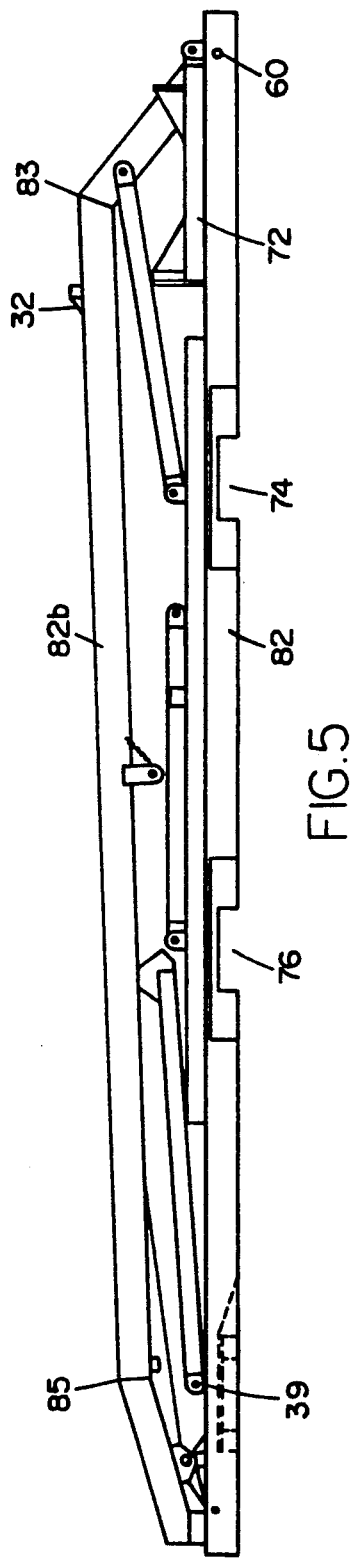

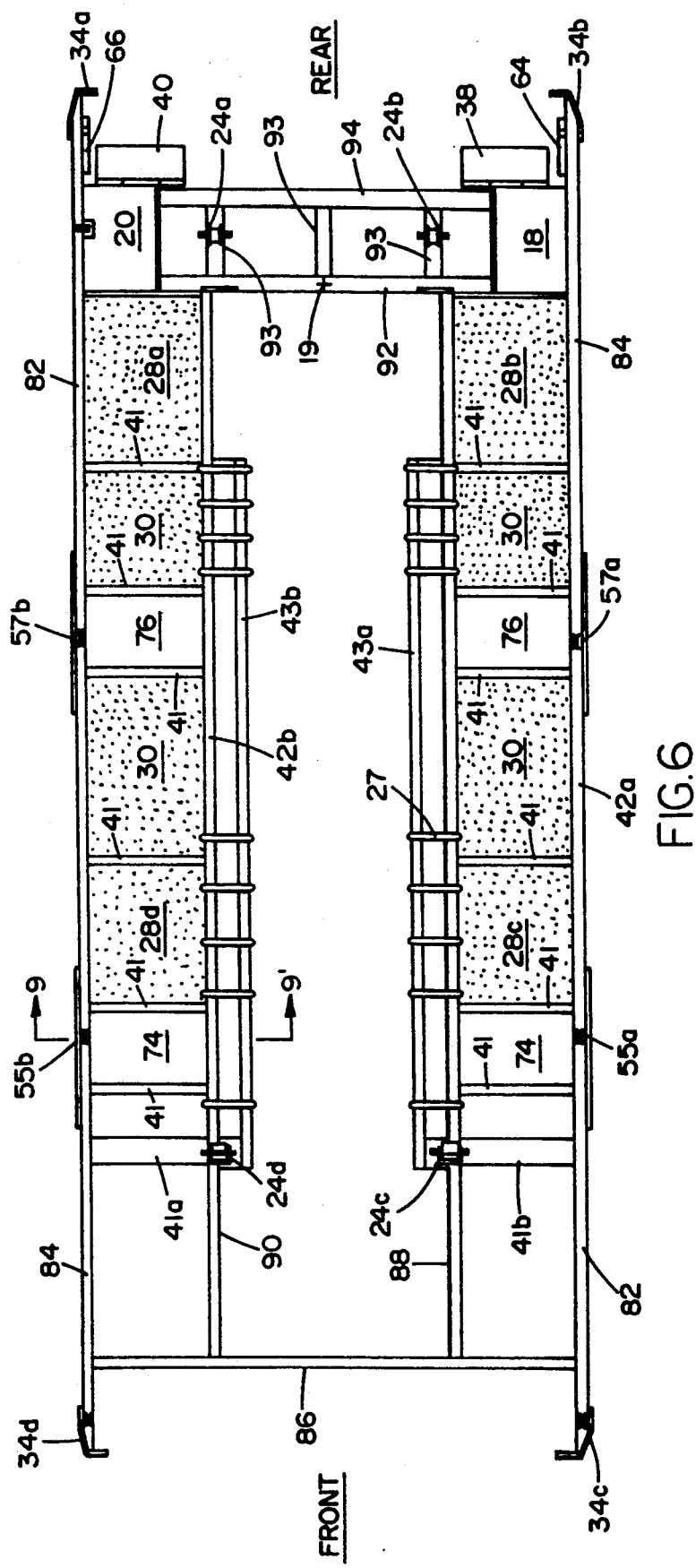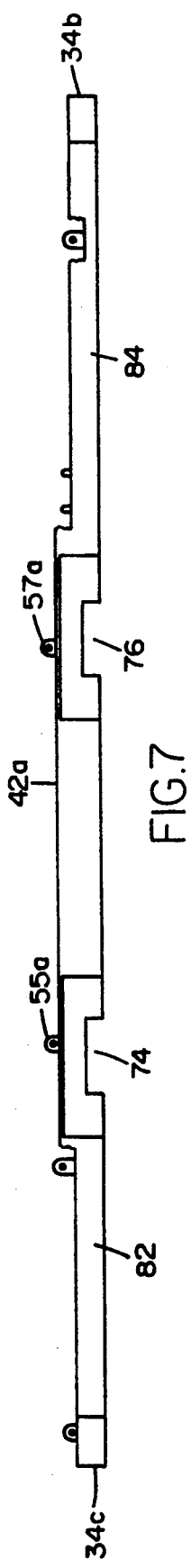

METHOD AND APPARATUS FOR CONTAINERIZED SHIPMENT OF AUTOMOBILES

This is a continuation of copending application Ser. No. 559,294 filed on Jul. 27, 1990, now abandoned.

BACKGROUND OF THE INVENTION

1. Field of the Invention

The present invention generally relates to a mechanical system for transporting and loading of automobiles in cargo containers, and more particularly, to a mechanical system in which two automobiles can be driven onto a car rack, secured, and the car rack loaded into a cargo container by utilizing a forklift.

2. Discussion of the Prior Art

The handling, loading, shipment and unloading of automobiles form one geographical location, point of manufacture, to another geographical location, point of sale, has been accomplished in a variety of ways that have proved costly and time consuming. Shipping automobiles overseas usually involves individually loading the automobiles onto specially designed ships such as pure car carrier PCC) ships which are capable of carrying approximately 6000 automobiles. Shipping automobiles cross-country usually involves loading the automobiles onto specially designed railroad cars such as tri-level cars (TLC) and double stack container cars (DSCC). The regional shipment of automobiles usually involves transporting the automobiles on specially designed tractor trailers. Each transfer, from one form of transport to another, involves additional unloading and loading steps which introduce a substantial risk of minor damage and additional expense to the distribution claim.

Standardized enclosed, dry freight, intermodal shipping containers have become the container of choice for modern marine, railroad, and over-the-road transportation networks.

A recent trend in shipping automobiles has been to ship or transport them in intermodal cargo containers. These intermodal containers can then be shipped utilizing any of the above methods without unloading and loading the automobile at the point of transfer. The major advantage in using intermodal containers is that they usually protect the automobiles from transit damage. In addition, the use of these containers facilitate the handling of multiple automobiles as opposed to handling each automobile individually. With the increased use of intermodal cargo containers, specialized container for the efficient storage of automobiles within the containers were developed. These specialized containers solved the problem of transit damage, but are capital intensive, and of minimal value on the backhaul to return the specialized container to the point of auto shipment. They also required specialized loading stations to load and unload the automobiles into and out of the containers, which effectively precludes their use if an unloading station is not available at the point of destination.

Various attempts have been made to maximize the number of automobiles that may be suitably stored and shipped in containerized units in view of the length limitations for containers which are generally in the range of 40 to 48 feet long. In some cases, the specialized containers increase the number of automobiles that may be shipped in a single container but the cost of the specialized containers has proved to prohibitive. There are a plurality of automobile racks presently available for the storage and shipment of automobiles, some of which are described below.

U.S. Pat. No. 3,178,216 to J. R. Huber discloses a cargo pallet construction capable of receiving a single automobile and which is used in the transportation of said automobile. The cargo pallet when loaded with a single automobile can be handled in a variety of ways including through the use of a forklift. The cargo pallet is equipped with tunnel structures for the engagement of the forklift which can be utilized on either side of the cargo pallet. The cargo pallet is collapsible so as to permit more space on the return trip. Each cargo pallet is capable of supporting at least one other cargo pallet carrying a single automobile.

U.S. Pat. No. 3,650,416 to Bodenheimer discloses a specialized vehicle carrier capable of being stacked in an intermodal system with a variety of configurations. The system is capable of carrying up to four automobiles on a plurality of adjustable ramps. This system is an open air system which can be utilized by the railroad and truck chassis as well as with cargo carrying ships.

U.S. Pat. No. 4,759,668 to Larsen, et al. discloses another specialized container for shipping automobiles. The container must be fitted with extensive specialized side rails which engage removable wheel supports for supporting the automobiles. The disclosure of this patent also includes an extensive summary of prior art patents dedicated to shipping automobiles.

U.S. Pat. No. 4,343,401 to Paulyson discloses another specialized automobile container. This invention describes the installation of upper and lower automobile tracks inside of a standard intermodal container fitted with a plurality of slotted sideposts thus enabling four automobiles to be carried. This system is a reusable kit that must be assembled and disassembled each time the system is to be used, and can only be used in containers having slotted sideposts. In addition, this type of system requires that the automobiles must be driven into the cargo container, adding a substantial risk of damages to the auto and the driver, when the driver exits or enters the automobile in a confined and elevated space. Frequently the only point of entry when the automobile is within the container is a door window.

U.S. Pat. No. 4,371,298 to Van Iperen discloses vehicle supporting ramps for cargo containers. This system makes use of knockdown disposable vehicle supporting ramps which are securely fastened to the floor of the containerized unit. The ramps are such that the front end of one automobile is under the tail end of a second automobile. The wheel harness assembly is the only part of the system that is saved after a shipment is delivered, thereby eliminating the cost of having to ship the entire system back.

U.S. Pat. No. 4,637,763 to Van Iperen discloses a hanging multi-deck system for storing and shipping articles in containers. The system is basically a removable multi-deck system for the transportation of non-stackable cargo. The system utilizes a series of removable vertical support hangers in combination with a series of horizontal support rails for subdividing the vertical space in the containers.

U.S. Pat. No. 4,611,961 to Van Iperen et al. discloses a wheel harness and a method for mounting a wheel harness on a wheel of an automobile. The wheel harness includes a loop strap adapted to extend over a top surface and along the inside face of a vehicle wheel, a hook strap to extend across a vertically extending surface of the wheel and along the inside face thereof, and a lashing strap for connecting the loop and hook straps to a support structure.

SUMMARY OF THE INVENTION

The rack system of the present invention provides for the rapid and efficient storage of automobiles in standard, unaltered intermodal containers which can be transported and back hauled in the usual manner without any of the disadvantages of the above mentioned devices or methods. The rack system of the present invention allows for two automobiles to be driven onto a single rack, the driver being able to easily exit through the door of the automobile, and then have the rack and two automobiles loaded into a shipping container through the use of a forklift. The use of a forklift allows the racks and method to rapidly load and unload the container, even in remote locations, with no specialized freight handling facilities. Each rack system is capable of coupling with another rack system; therefore, one rack system can be used to pull or push a second rack system into or out of the container. Thus when one rack system is loaded into the front end of a container, the loading of the second rack system, can be used to position the first rack system and thus have both racks positioned and secured in relation to each other and to the container simultaneously. In the reverse operation, the second rack, the last one loaded, can be removed utilizing a forklift, which then pulls the first rack system out of the container as the second (to be loaded) is removed. Once the automobiles are driven off the rack system, the rack system can be collapsed almost to a flat position, thereby reducing the area required for the storage of the rack system and allowing the transportation of multiple rack systems back to their point of origin in a single container.

The rack system of the present invention provides for an automobile rack that is completely removable from the shipping container, strong and relatively lightweight. The rack system comprises few moving parts and thus is extremely reliable and durable. The rack system does not require an operator with a specialized skill other than the knowledge of how to operate a forklift. The use of this rack system does not require that the standard intermodal shipping containers be modified in any shape, way or form, nor does it require specialized loading or unloading facilities. The rack system of the present system can be employed in any standard intermodal shipping container. The use of the rack system of the present invention provides for the safe and efficient shipping of automobiles by providing a system in which the automobiles are securely fastened to the rack and each rack is securely fastened to each other and the container. Since there is no possibility of movement and the drivers do not have to climb out of the cars within the containers, the automobiles will not be damaged.

BRIEF DESCRIPTION OF THE DRAWINGS

FIG. 3 is a diagrammatic perspective of the portable and collapsible automobile rack of the present invention in its erected state, with partial break aways for clarity of illustration.

FIG. 4 is a side elevation view of the portable and collapsible automobile rack of the present invention in an erected state.

FIG. 5 is a side elevation view of the portable and collapsible automobile rack of the present invention in a collapsed state.

FIG. 6 is a top plan view of the lower tier of the present invention.

FIG. 7 is a side elevation view of the lower tier illustrated in FIG. 4.

DESCRIPTION OF THE PREFERRED EMBODIMENT

The car rack system of the present invention is a multi-vehicle, collapsible, vehicle storage and transportation system. The car rack collapses to an almost flat position so as to occupy much less space when not in use, and may be quickly opened to its erect position to provide space for a second vehicle. A variety of automobiles and tiedown configurations may be accommodated to transport automobiles from virtually any manufacturer. The drawings and the accompanying specification provide the best mode contemplated for constructing the car rack system as well as the best mode of utilizing the invention.

The preferred method for loading automobiles onto the car rack of the present invention is a simple and rapid operation requiring only a forklift and forklift operator. This means that either loading or unloading may be carried out in virtually any remote freight yard or warehouse. No specialized auto or rack handling equipment or stations are required. The loading of four automobiles onto two car racks and into the intermodal shipping container can be accomplished quickly and easily in approximately 17 minutes. The unloading of the two car racks from the intermodal shipping container and the removal of the four automobiles enclosed therein can be accomplished in approximately nine minutes.

Figure 1B:
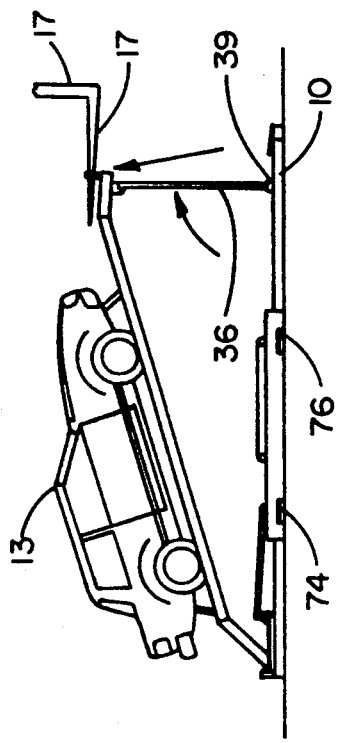
FIG. 1 is a sequential series of illustrations 1a through 1h, which illustrate the various steps in the method of the present invention.
Figure 1D:
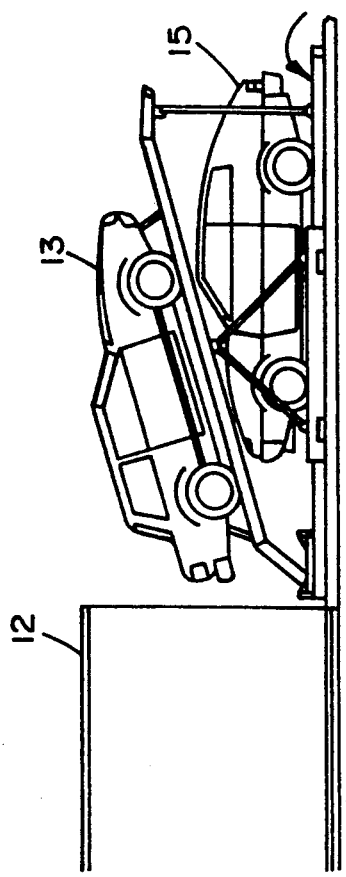
Figure 1A:
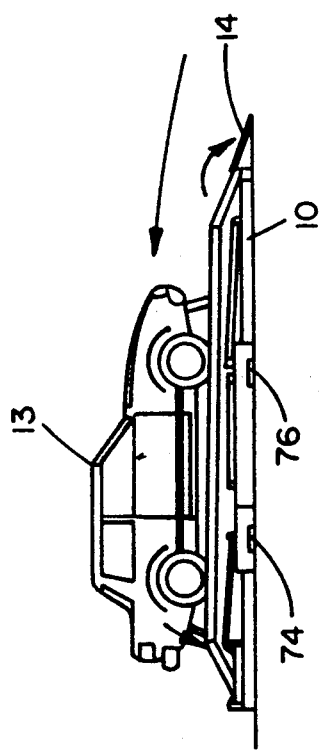
Figure 1C:
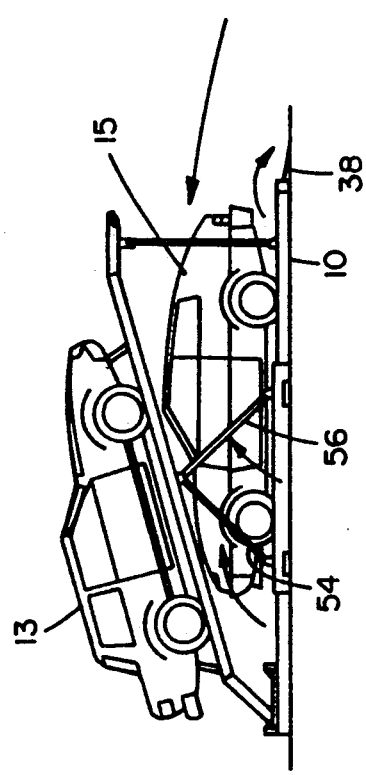
Figure 1H:
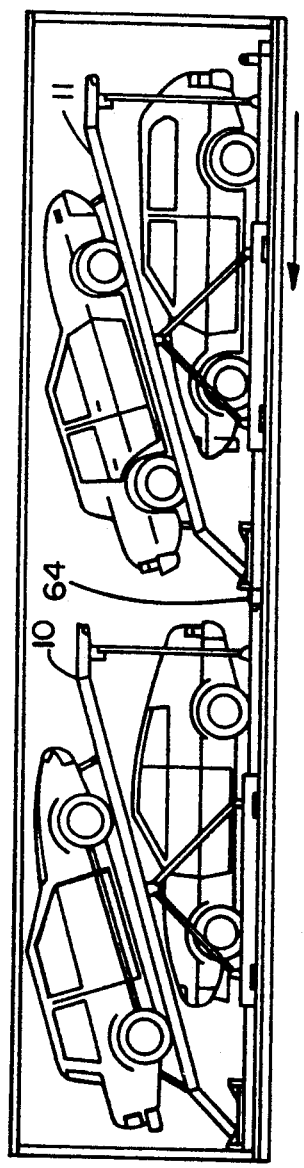
Figure 2B:
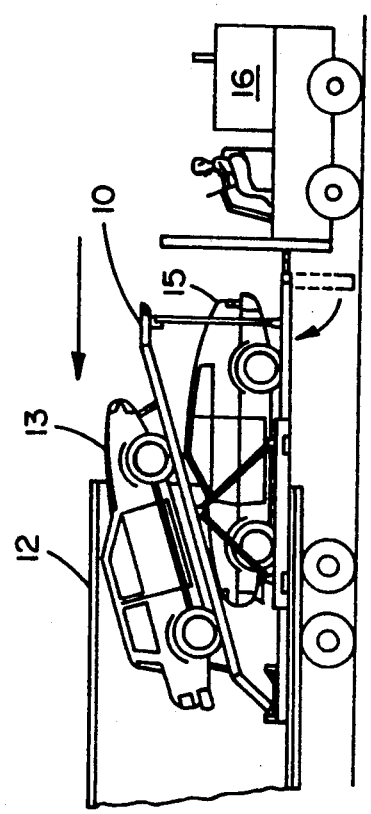
FIG. 2 is a sequential series of illustrations 2a and 2b which illustrate an alternate embodiment of the method of the present invention.
Figure 2A:
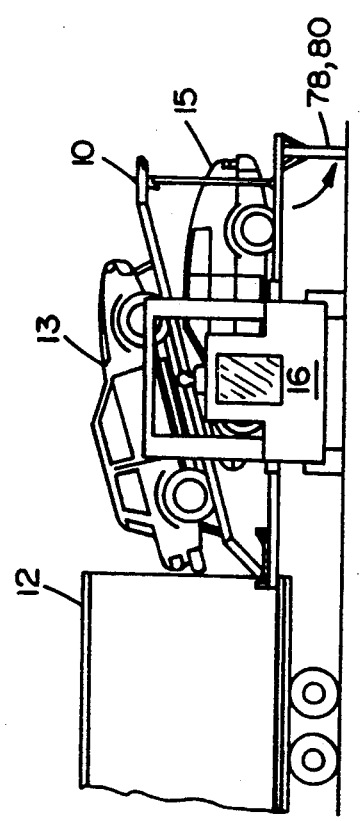
Figure 8:
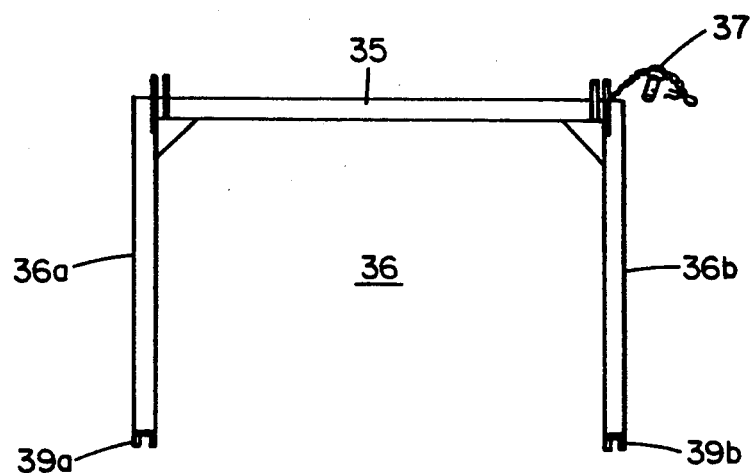
FIG. 8 is a front elevation view of a vertical support frame used by the present invention.
Figure 9:
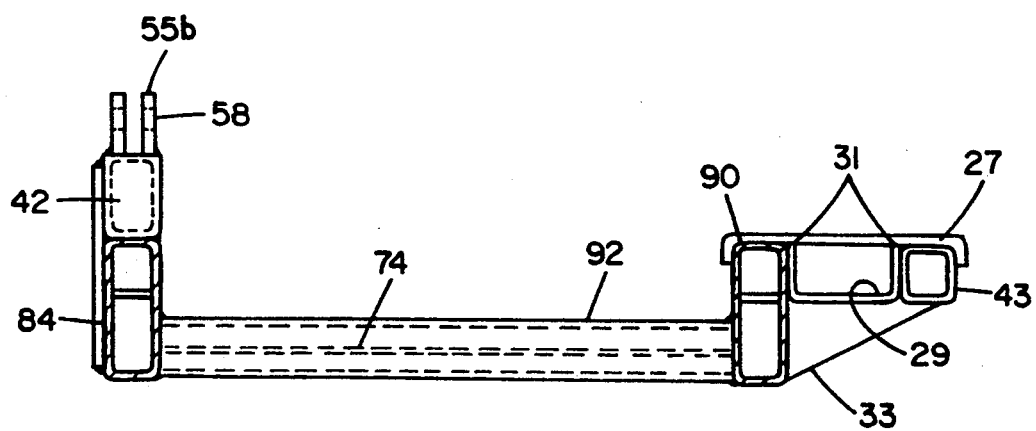
FIG. 9 is a cross-section taken along section lines 9—9' of FIG. 6.

FIGS. 1a–1h illustrate the preferred method for the loading of automobiles onto the car rack 10 and into a cargo container 12 that is at or near ground level. FIGS. 2a–2b illustrate the preferred method of loading automobiles onto the car rack 10 and into a cargo container 12, when the container is chassis mounted or on a loading dock of some type. FIGS. 1g–1h also illustrate the insertion of the second car rack into the container. The method for unloading the car racks 10 and 11 from the cargo container 12, and the removal of the automobiles from the car rack 10 will also be discussed.

FIG. 1a illustrates the car rack 10 in its collapsed position. The collapsed position is used for loading of an automobile onto the top tier, and to facilitate empty storage and handling. Prior to loading the car rack, it is normally positioned adjacent the open end of container 12, with the front end of the car rack resting on the floor of the container. Alternately, the car rack can be loaded at a remote location, and then transported to the container by a forklift, as illustrated in FIG. 2a.

As illustrated in FIG. 1a the first automobile 13 is driven onto the upper tier of the rack 10. With the rack 10 in a collapsed position, the upper tier of the rack is near ground level, and is accessed by lowering a pair of upper tread plates 14 from the upper tier to the ground thereby forming a ramp. The ramp allows the first automobile 11 to be driven onto a pair of wheel receiving channels (illustrated in FIG. 3) which form an integral part of the upper tier of the car rack 10. The upper tread plates 14 are connected to the wheel receiving channels by a pair of pivoting hinges (as illustrated in FIG. 3). The first automobile 13 is backed onto the upper tier until the rear wheels of the first automobile 13 are in engagement with a pair of rear wheel stop plates 32 (illustrated in FIG. 3) The automobile is then secured in place by first and second upper rear end tie down straps and first and second upper front end tie down straps. As will hereinafter be explained in detail, the first and second rear and first and second front end tie down straps are fully adjustable for securing a plurality of different automobiles from different manufacturers in different tie down configurations. After the first automobile 13 is secured in place, the upper tread plates 14 are folded back into their original position on their respective wheel channels. With the first automobile 13 securely fastened and the upper tread plates 14 in their original position, a forklift is used to raise the upper tier of the car rack 10 to its erect position as shown in FIG. 1b, thereby allowing a second automobile 15 to be loaded onto the lower tier of the car rack 10.

As will be hereinafter explained in greater detail, the upper tier of the car rack 10 is raised by inserting the tynes 17 of the forklift 16 into a pair of pivotably mounted yokes 22a, 22b which are mounted on a rear cross member of the upper tier, and then lifting the upper tier to its fully extended position. Once the upper tier of the car rack 10 is in its fully extended position, as illustrated in FIG. 1b, a folding frame support 36 is swung from its folded position to an upright position so as to provide support for the upper tier. The folding frame support 36 is pivotably mounted to the lower tier by a bolt and yoke configuration 39 illustrated and hereinafter described with respect to FIG. 3. Once in the full upright position, the folding frame support 36 is pin connected on each side to a flange attached to the upper tier to secure the tier in the erect position for shipment.

Once the folding frame support 36 is secured in the locked position, a pair of lower tread plates 38, 40 (illustrated in FIG. 3) are folded down to the ground so as to permit a second automobile 15 to be driven onto the lower tier of the car rack 10 as shown in FIG. 1c. The second automobile 15 is driven forward onto a pair of lower wheel receiving channels, until the front wheels of the second automobile 15 are in engagement with a pair of front wheel stop plates. When the second automobile 15 is in position against the front wheel stop plates, it is strapped down by first and second lower rear end tie down straps and first and second lower front end tie down straps. Once the second automobile 15 is strapped securely into place, the center diagonal braces 54a, 54b, and 56a, 56b, are moved into their respective support positions. The support braces 54a, 54b and 56a, and 56b, are pivotably mounted to the lower tier, and pin connected to a pair of yokes, attached to the upper tier, by a set of pins. Once the support braces 54 and 56 are locked into place, the lower tread plates 38 and 40 are folded back into their original position on their respective lower wheel receiving channels 42 and 44 as shown in FIG. 1d.

With both the first and second automobiles 11,15 securely fastened to the car rack 10, the car rack 10 is now ready for loading into the cargo container 12. The tynes 17 of the forklift 16 are inserted into a pair of forklift pockets 18, 20 (illustrated in FIG. 3) in the rear end of the lower tier of the car rack 10. The forklift 16 then lifts the loaded car rack 10 slightly off the ground and pushes the car rack 10 into the cargo container 12 by skidding the car rack along the container floor. This is illustrated in FIGS. 1d and 1e. It is important to note that the rack 10 is resting on the floor of the cargo container 12 as it is being pushed in by the forklift 16 and that the car rack 10 is designed with integral skid plates to prevent damage to the cargo container 12 floor during this operation. The forklift 16 pushes the car rack 10 inwardly until the rear end of the car rack 10 is approximately 10 to 12 inches inside the open end of the cargo container 12 as shown in FIG. 1f.

Once the car rack 10 is resting in place inside the cargo container 12, a second car rack 62 is positioned at the rear of container 12 and then loaded with third and fourth automobiles 21 and 23 in exactly the same manner as illustrated in FIGS. 1a–1c. Once the second car rack 62 is loaded with the third and fourth automobiles 21 and 23 and both are securely fastened with tie down straps, the rear end of second car rack 62 is lifted slightly by the forklift 16, and pushed against the first car rack 10 as shown in FIG. 1h. Each car rack 10 and 62 is equipped with reinforced push plate ends 34 on the lower tier so as to facilitate the pushing of one car rack into another without damage to either. The forklift 16 then pushes both car racks into the container, by skidding them along the container floor. Once both car racks 10 and 62 are pushed snugly into the cargo container 12, first and second latch devices 64, 66, (illustrated in FIG. 3) located on the first car rack 10, are connected to first and second latch points on car rack 62. It should be noted that each car rack 10 and 62 both has first and second latch devices and first and second latch points to provide interchangeability in loading order. The latch connection between the two car racks 10 and 62 serve a dual purposes; first, to prevent shifting of the two car racks 10 and 62 while underway; and secondly, to facilitate the removal of both car racks 10 and 62 in a single operation.

The car racks 10 and 62 are specifically designed to fit snugly in a 40 foot standard sized intermodal container. If they are to be placed in a 45 foot container, a pair of dunnage spacer bars one of which is illustrated at 72, which are mounted on the lower tier of the car racks 10, 62 are swung to their open positions to take up the extra space within the container, and prevent movement of the car racks 10 and 62 within the cargo container while underway.

The car racks 10 and 62 may be removed from the intermodal container 12 with a simple forklift, and do not require complex unloading stations or equipment, and do not involve the use of a driver to enter the cars while the cars are still in the container. In the first step of removing the car racks 10 and 62, a chain or cable is attached to the forklift 16 and to pulling eye 19 mounted on the lower tier of each of the car racks, as illustrated in FIG. 3. The pulling eye 19 is attached to a tubular cross beam 92 of the lower tier of the car rack 62. Once the cable or chain is securely fastened, the forklift 16 proceeds to pull both car racks 62 and 10 out of the cargo container 12 and onto the ground. Once both car racks 10 and 62 are out of the cargo container 12, the first and second latch devices 64 and 66 are opened, thereby separating the two car racks 10 and 62.

Once the two car racks 10 and 62 are separated, they can be transported via forklift 16 utilizing one of two methods. In the first method, which is used when only a few feet of movement is required, the tynes 17 of the forklift 16 are inserted into the pair of slots in the rear end of the lower tier of car rack and then the car rack is lifted slightly off the ground and skidded to the new location. In the second method, the tynes 17 of the forklift 16 can be engaged in a pair of channels 74 and 76 which run transversely through the lower tier of each of the car racks. Channels 74 and 76 are ideally located on either side of the center of gravity of a fully loaded car rack. If the car rack 62 is engaged at this point, the only limit on how high the car rack 62 can be lifted is how high the forklift 16 is capable of lifting it. These transverse channels 74 and 76 are also important in the loading of the car racks 10 and 62 when the intermodal cargo container 12 is chassis mounted and substantially off the ground, or when the loaded car racks are to be moved to a new location.

FIGS. 2a-2b, illustrate the method employed in the loading of car rack 10 when the intermodal container is chassis mounted. Car rack 10 is first loaded at ground level by the method illustrated in FIGS. 1a-1c, previously described. When the intermodal cargo container 12 is chassis mounted or when the cargo container 12 is otherwise substantially off the ground, a simple forklift is employed for loading the loaded car rack. Referring now to FIG. 2a, the forklift 16 drives around to either side of car rack 10 and inserts the lifting tynes 17 into channels 74 and 76 as described above. Once the forklift 16 has engaged the car rack 10, the car rack 10 is lifted to a height equal to the height of the floor of the cargo container 12 and transported to the cargo container 12 as illustrated in FIG. 2(a) with the wheel receiving channels aligned with the container, and the forklift tynes transverse to the container.

Once the car rack 10 is in position outside of the cargo container 12, the forklift operator proceeds to sideslip the car rack 10 into the cargo container 12 approximately 6" to 12" as shown in FIG. 2a. With the car rack 10 partially resting on the floor of the cargo container 12 and supported by the forklift 16, the forklift operator proceeds to the rear end of the car rack 10 and unfolds a pair of rear support legs 78, 80. These rear support legs 78 and 80 are capable of supporting the weight of the fully loaded car rack 10, thus enabling the forklift operator to disengage the forklift 16 from the car rack 10 so as to be able to move to a new position illustrated in FIG. 2b for the further insertion of the car rack 10 into the cargo container 12.

With the car rack 10 supported by the cargo container 12 and the rear support legs 78 and 80, the forklift operator positions the forklift 16 at the rear end of the car rack 10 so as to be able to insert the tynes 17 of the forklift into the pair of slots in the rear end of the lower tier of the car rack 10, thereby once again supporting the car rack 10, as shown in FIG. 2b. Once the forklift 16 is supporting the weight of the car rack 10, the rear support legs 78, 80 are folded into their original positions. Once the rear support legs 78, 80 are in their original positions, the forklift operator proceeds to push the car rack 10 into the cargo container as illustrated in FIG. 2b. As before, the forklift 16 is used to push or skid the car rack 10 inwardly until the rear end of the car rack 10 is approximately 10 to 12 inches inside the open end of the cargo container 12.

Once the car rack 10 is resting in place inside the cargo container 12, a second car rack 62 is loaded with the third and fourth automobiles 21 and 23 in the same manner as previously described and illustrated in FIGS. 1a-1c. Once the second car rack 62 is loaded with the third and fourth automobiles 21 and 23 and both are securely fastened, the second car rack 62 is moved into position right outside the cargo container 12 in a manner identical to that illustrated in FIG. 2a and described above. The process of lowering the rear support legs 78, 80 and the process of positioning the forklift 16 as described above and illustrated in FIGS. 2a is repeated for the second car rack 62. Once the second car rack 62 is in the position shown in FIG. 2b, the forklift 16 skids the second car rack 62 into the first car rack 10 as described earlier. Once the skid plates have made contact, both car racks 10 and 62 are skidded into the cargo container 12, the first and second latch devices 64, 66 are secured to the first and second latch points 68 and 70 as illustrated in FIG. 2h.

The removal of car racks 10 and 62 from a chassis mounted intermodal cargo container 12, requires the reversal of the procedures required in the loading of the intermodal cargo container 12, with one significant exception. When removing loaded car racks from a ground level container, the racks are simply pulled out with the forklift. When pulled from a chassis mounted container however, the tynes of the forklift must first be inserted into the rear forklift pockets 18, 20 of the car rack, before the chain or cable is attached to the pulling eye 19. When car rack 62 is pulled out of the rear of cargo container 12, car rack 10 is also pulled to the rear of the cargo container 12. After car rack 62 is pulled to the position illustrated in FIG. 2b, the support legs 78, 80 are lowered and locked into place. The forklift is then moved to the position illustrated in FIG. 2a and the loaded car rack is lifted out of the cargo container 12 as opposed to being pulled out.

The procedures illustrated in FIGS. 1a-1c are then reversed to unload the automobiles from the car racks. The lower auto 15 is unhooked from the tie down straps and backed out of the car rack. The upper tier is then engaged by forklift 16, and the vertical supports 54, 56 and 36 are pivoted out of the way. The forklift 16 then gently lowers the upper tier to its collapsed ground level position and the automobile 13 is unhooked and driven off the rack.

The construction of the car racks will be herein described with respect to FIGS. 3-9.

The lower tier of rack 10 consists essentially of two frame assemblies which define wheel receiving channels. Each channel has an outer frame 82, 84 and an inner frame 88, 90 wherein the space created between two sets of frames defines a pair of wheel receiving channels for the automobile. The outer frame for the lower tier includes a first side rail 82 which defines the length of the car rack and a front cross rail 86 joining the first and second frame assemblies. As shown in FIG. 3, the front cross rail 86 is recessed in from the front end of the rack. This first and second outer side rails 82,84 are hollow steel beams and the front cross 86 rail is seamless steel rectangular tubing. Forklift pocket 74 and 76 are defined in the center region of each of the inner and outer rails 82,84 and 88, 90, and are reinforced with mid-frame tubular support beams 42a, 42b which reinforce the car rack and prevent flexure when transversely engaged by the tynes of the forklift. The side fork pockets 74, 76 are channels cut out of the rails 82, 84 and 88, 90 and then reinforced by steel plating as illustrated. Each end of the side rails is beveled and is reinforced by steel plating to form push plates 34a–c. The push plates protect the end of the rails when one car rack is pushed against a second car rack as discussed earlier. The use of hollow steel beams provides an integral skid for the car rack along the underside of beams 82, 84 and 88, 90. On the front end of each of the side rails is a hinged dunnage extension bar 72 which takes up additional space in the cargo container when the car racks are loaded in longer containers. When in the retracted position, the dunnage extension 72 resets on outer rails 82, 84. On the rear end of each of the rails 82, 84 are latching devices 64, 66 used to connect one rack to a second rack. The latching devices 64, 66 are bolted to the inside of the outer rails 82, 84 and engages latch slots 68, 70 defined in the push plates 34 of siderails 82, 84 or, if the dunnage extension 72 is deployed, the latch means 64, 66 engages slots (one of which is illustrated at 71 in FIG. 3) defined in the dunnage extensions of the adjoining car rack.

At the rear of the lower tier, a first rear cross rail 92 is connected to a second rear cross rail 94 also made out of seamless steel rectangular tubing, by a pair of forklift pockets 18 and 20, and three rear longitudinal beams 93 made out of seamless steel rectangular tubing. Attached to the outer two of the three rear longitudinal beams are winches 24a, 24b for adjusting the tension of the tie down straps which hold the automobile in place. A chain engaging pulling eye 19 is attached to the first rear cross rail 92. This chain engaging pulling eye is used to pull the loaded car racks out of the intermodal container.

Attached to the first and second inner longitudinal rails 88, 90 are first and second tie down support channel assemblies. As illustrated best in FIG. 9, the tie down assemblies are formed by tie down support tube 43 and winch strap receiving channel 29 which are welded together and welded to the inner longitudinal rail 90. Gusset plates 33 and tie down bars 27 strengthen the assembly which simultaneously provides a plurality of tie down supports.

A plurality of tie down bars are deployed in a ladder configuration and are connected across the strap receiving channel to provide precise positioning of the tie down straps at the proper location under each automobile. At the present time each automobile manufacturer specifies a different place or position for securing the hook means 26(a–h) and their associated tie down straps 25 (a–h). The automobile manufacturers specify that the straps must be within 45° of vertical to avoid frame distortion which might otherwise occur from the combination of lateral strap loading and load induced weight shifts during shipment. The arrangement of the strap receiving channels 29 and the tie down bars 27 adjacent each of the wheel wells 28(a–h) provide flexibility and vertical strap loading when securing the automobiles to the car racks. The strap is passed through the strap receiving channel 29, and under the tiedown bars, until directly under the tie down point specified by the manufacturer of the automobile being shipped. The tiedown bars are spaced approximately 12" apart, therefore the greatest lateral distance that can be encountered is approximately 6". Since the specified hook points are 10" to 12" up, the loading angle is well within 45°. Self ratcheting winch means 24 (a–h) are provided for each strap and wheel well to selectively tighten the associated wheel strap and secure the automobiles to the rack. At the point of disembarkation, each ratchet is selectively releasable so that the straps may be quickly and easily disengaged to remove the vehicle.

The space created between the inner rails 88, 90 and outer rails 82, 84 define the wheel receiving channels for the automobile. Between the inner and outer side rails are a series of side cross rails 41 which provide support for the floor plate of the wheel receiving channels. The wheel receiving channels are divided into four main sections. The first section starting at the rear of the lower tier includes the rear wheel wells, 28a, and 28b; the second section is a pair of ramp plates 30; the third section, which is on the forward side of the first transverse fork pocket is a second set of ramp plates 30, and the last section includes the forward wheel wells 28c and 28d. A pair of forward wheel well stop plates 32a and 32b are connected to the end of the forward wheel well and are used to prevent the automobile from over running the channels during the loading process. All sections of the wheel receiving floor plate are made out of mushroom perforated steel plate. Additional support between the inner and outer side rails is provided by a first and second side cross rail 41a, 41b, which are located on the forward side of the second transverse forklift pocket.

At the rear end of the lower tier, two ramp plates 38, 40 are hinge connected to the rear fork pockets 18 and 20. The ramp plates allow the automobile to be driven onto the wheel receiving channels. The rear fork pockets 18, 20 are formed of steel plates and define the forklift slots for rear engagement with the forklift tynes. Once the automobile is driven onto the wheel receiving channels, the two ramp plates are folded onto the rear fork pocket plates.

The upper tier of the car rack is constructed in a similar manner as that of the lower tier with two significant exceptions. The first and second outer side rails of the upper tier define a pair of knuckles 83 and 85, best illustrated in FIGS. 4 and 5. These knuckles are formed of three sections of beams as opposed to the one continuous beam used in the lower tier. On the front end of each rail is a pair of short beams 81a, 81b, knuckle connected by welding, to the center section so as to enhance the vertical clearance between the upper and lower tiers of the car rack. On the rear end of each rail are a second pair of short-beams 87a, 87b knuckle connected by welding so as to form a ramp for driving the second automobile onto the upper tier when the rack is in the collapsed position illustrated in FIG. 5. The outer rails of the upper tier are connected with a front cross beam 91 which connects the two side rails at the front knuckle and a rear cross beam 89 at the end of the side rails.

The inner rails are formed differently in two sections 88b, 88c and 90b, 90c and are connected to the front cross beam 91 and the rear cross beam 89 on their respective ends. The two center rails each consist of two sections, b and c, the main sections of which (88c, 90c) runs parallel to the main sections 82b, 84b of the two side rails. The two sections are welded together to form a knuckle at 79a, 79b forward of the side rail knuckle joints.

The use of different knuckle angles between inner and outer rails enables the automobile to be loaded over a significant ramp angle without creating a clearance problem for the underside of the automobile being loaded. If the inner rails 88, 90 had the same knuckle angle as the outer rails 82b, 84b, then the under carriage of the car would drag across the knuckle 85 illustrated in FIG. 5. By extending the inner rail sections 88b, 90b the inner knuckle is lowered to provide car clearance, even though the effective knuckle angle is maintained.

Connected to the inside of the center rails are four tie down ladders 27(e-h). These tie down ladders are used in the same way as the support channels and tie down ladders used in the lower tier. Cross beams 52 are mounted between the center rails on each side of the tie down ladders, except for the forward ladders which are attached to the front cross beam 91 of the upper tier. Mounted on the front cross beam is a front pair of winch devices 24e, 24f for adjusting the tension of the tie down straps on the rear wheels of the second automobile. A rear pair of winch devices 24a, 24b is also provided for adjusting the tension of the tie down straps on the front wheels of the second automobile, and are mounted on a cross beam 52a just rearward of the knuckle joint on the center rails. Mounted on the rear cross beam are a pair of pivotably mounted forklift engagement yokes 22a and 22b which are engaged by the forklift tynes when the car rack is raised to its erect position.

The upper tier also contains a pair of wheel receiving channels for the second automobile. The wheel channel floor plates are sectionalized in a similar manner as in the lower tier and are supported by cross beams 51, illustrated in FIG. 4. The only significant difference between the sections corresponds to the different angles created by the knuckle joints in the upper tier. Ramp plates 14 are hingedly attached to the rear end of the wheel receiving channels of the upper tier.

The upper tier is pivotably connected to the lower tier by pins and frame pivots 60 at the front of the car rack, as illustrated in FIGS. 4-5.

The upper tier is supported in the erect position on the rear end thereof by a vertical folding frame assembly 36 which is pivotably connected to the lower tier. The folding frame assembly folds inwardly to the collapsed position from the vertical support position when it is desired to collapse the car rack for backhauls. The folding frame consists of two vertical members 36a, 36b and one horizontal cross member 35 which are welded together with gusset plates for reinforcement. Each of the vertical members is pivotably connected by a pin and yoke assembly to the outer siderails as illustrated at 39a and 39b. Once in the upright position, the frame is pin connected by a pair of pins, one of which is illustrated at 37, to the upper tier. Support for the upper tier in the erect position is additionally provided by two pairs of center diagonal braces 54a, 54b and 56a, 56b. The two pairs of center braces are pivotably connected to the support beams of the lower tier at 55a, 55b and 57a, 57b and are pin connected together on the flange located on the outer rails 82b, 84b of the upper tier by pin member 75. The center braces are angled in such a way as to equally distribute the load in the center region of the upper tier in a truss like manner to the lower tier.

We claim:

1. A portable and collapsible car rack for loading and shipping cars in a standardized intermodal container, said rack comprising:
   (a) a lower tier for receiving a car, said tier having a first and a second end, and defining a pair of wheel receiving channels for said car and a first longitudinal axis;
   (b) an upper tier for receiving a second car, said upper tier formed of first, second and third beam members, said second beam member defining a pair of wheel receiving channels for a car and a second longitudinal axis, said upper tier being pivotally mounted to said lower tier by said first beam member at a first end thereof to define a pivot axis, so that the upper tier may be pivoted about said pivot axis from a first collapsed position wherein said first and second longitudinal axis overly one another, to a second erected position with said second longitudinal axis forming an acute angle with said first longitudinal axis,
   (c) a first knuckle defined by said upper tier between said first beam member and said second beam member, said first and second beam members being joined together at said first knuckle to define a first obtuse angle to enhance the vertical clearance between said upper and lower tiers when said upper tier is pivoted into its second erected position, said first knuckle and said first beam member defining a clearance space for an end of a car to be received by said lower tier;
   (d) a second knuckle defined by said upper tier between said third beam member and said second beam member, said second and said third beam members being joined together at said second knuckle to define a second obtuse angle, said third beam member defining a car ramp for receiving a car which is driven onto said upper tier when said upper tier is collapsed into its first position;
   (e) a pair of inner rails and a pair of outer rails formed at said second knuckle of said upper tier which together form a pair of wheel receiving channels of said car ramp and which join with said wheel receiving channels of said second beam member, with the outer rails defining said second knuckle as a second outer knuckle and with said inner rails of each wheel receiving channel defining a separate inner knuckle further from said second end than said second outer knuckle, said inner knuckle providing additional undercarriage clearance for cars driving thereover;
   (f) a folding vertical frame at said second end of said lower tier to support said upper tier in said second erected position and thereby define a second car receiving space therebetween when said vertical frame is secured to said tiers; and
   (g) means for securing said cars to said tiers for shipment.

2. A portable and collapsible car rack as claimed in claim 1 wherein said lower tier further includes means for receiving the tines of a forklift when said tines are transverse to a longitudinal axis of said wheel receiving channels, whereby the rack, when loaded with cars, may be moved by a single forklift truck.

3. A portable and collapsible car rack as claimed in claim 1 wherein said upper tier further includes means for engaging the tines of a forklift to pivot said upper tier to its second erected position.

4. A portable and collapsible car rack as claimed in claim 1 wherein said means for securing said care to said tiers includes a pair of wheel wells defined in each of said wheel receiving channels, and a plurality of tie-down bars extending perpendicularly to and adjacent to a longitudinal axis of each wheel well.

5. A portable and collapsible car rack as claimed in claim 4 wherein said means for securing said care further includes a hook for engaging the car, and a flexible strap extending from said hook to a ratchet drum, said strap passing under a predetermined tie-down bar to define a loading angle between the strap and said car.

6. A portable and collapsible car rack as claimed in claim 1 which further includes collapsible support means attached to a second end of said rack to support said rack when a first end has been loaded into a chassis mounted intermodal container.

7. A portable and collapsible car rack as claimed in claim 6 wherein said collapsible support means further comprises a pair of pivotably mounted legs which are parallel to the lower tier when in their collapsed position.

8. A portable and collapsible car rack as claimed in claim 1 wherein said rack further includes means to secure a second end of said rack to a first end of a second rack when a pair of racks are loaded into an intermodal container.

9. A portable and collapsible car rack as claimed in claim 1 wherein said lower tier further includes a pivotable dunnage means which may be pivoted into a horizontal position to extend the length of the lower tier.

10. A portable and collapsible car rack as claimed in claim 1 wherein said lower tier further includes push plates on at least one end thereof.

11. A portable and collapsible car rack as claimed in claim 1 wherein said lower tier further includes push plates mounted on each end thereof for engaging similar push plates on a second collapsible car rack.

12. A portable and collapsible car rack as claimed in claim 1 wherein at least the second end of said lower tier further includes means for engaging the tines of a forklift truck when said tines are arranged parallel to said wheel receiving channels.

13. A portable and collapsible car rack as claimed in claim 12 wherein said wheel receiving channels are supported by steel box frame members, said box frame members serving as a skid plate for sliding said rack.

* * * * *